United States Patent [19]

Bruch

[11] 3,863,022

[45] Jan. 28, 1975

[54] TELEVISION SIGNAL CLOCKED DELAY LINE FOR DELAY BY AN INTEGER NUMBER OF HORIZONTAL SCANNING LINES DRIVEN BY A PILOT SIGNAL

[75] Inventor: Walter Bruch, Hannover, Germany

[73] Assignee: TED Bildplatten Aktiengesellschaft, AEG-Telefunken, TELDEC, Zug, Switzerland

[22] Filed: May 8, 1972

[21] Appl. No.: 251,229

[30] Foreign Application Priority Data

May 7, 1971 Germany............................ 2122593
Apr. 6, 1972 Germany............................ 2216519

[52] U.S. Cl............................. 358/8, 360/36, 178/6
[51] Int. Cl............................ H04n 9/00, H04n 5/76
[58] Field of Search...... 178/5.4 CD, 6.6 TC, 5.4 R, 178/5.4 P, 5.4 S, 6, 6.6 A, DIG. 25, 69.5 PC, 5.4 C, 7.3 D, 5.4 EL; 315/169 TV; 307/221 D; 360/24, 33

[56] References Cited

UNITED STATES PATENTS

| | | | |
|---|---|---|---|
| 3,021,387 | 2/1962 | Ratchman | 178/5.4 EL |
| 3,526,711 | 9/1970 | DeBoer | 178/7.3 D |
| 3,580,991 | 5/1972 | Krause | 178/5.4 CD |
| 3,617,626 | 11/1972 | Bluth et al. | 178/5.4 AD |
| 3,733,435 | 5/1971 | Chodil et al. | 178/7.3 D |

FOREIGN PATENTS OR APPLICATIONS

| | | | |
|---|---|---|---|
| 1,211,936 | 11/1970 | Great Britain | 178/5.4 P |
| 2,056,276 | 5/1971 | Germany | 178/5.4 P |

*Primary Examiner*—Robert L. Griffin
*Assistant Examiner*—George G. Stellar
*Attorney, Agent, or Firm*—Spencer & Kaye

[57] ABSTRACT

A circuit for delaying video signals by one or more picture line scanning periods when the line scanning rate fluctuates with time, including a memory having elements supplied in sequence with respective successively occurring segments of one picture line signal, a generator for producing a series of clock pulses during each line scanning period, with each clock pulse reading out the segment previously stored in each successive element during a subsequent line scanning period, and a control system which maintains a fixed relation between the clock pulse rate and the line scanning rate.

7 Claims, 4 Drawing Figures

TELEVISION SIGNAL CLOCKED DELAY LINE FOR DELAY BY AN INTEGER NUMBER OF HORIZONTAL SCANNING LINES DRIVEN BY A PILOT SIGNAL

BACKGROUND OF THE INVENTION

The present invention relates to the playback of video signals, particularly in processes requiring the delay of the video signal.

In the television art it is often necessary to delay a television signal by the duration of one or a plurality of line scanning periods, for example to decode a color signal in a PAL decoder, or in a SECAM decoder, or to produce simultaneous signals in the TRIPAL color recording system. A delay having a duration of one line scanning period is also necessary for the formation of correction signals in connection with vertical aperture correction. The delay time may be equal to the line scanning period or deviate therefrom by a certain amount, for example in order to take into account a special chrominance subscarrier frequency.

Such a delay is usually effected by means of an ultrasonic delay line. Such a line is only able to delay a signal in the form of a carrier.

Under certain circumstances, for example when the line frequency of the signal does not correspond to the standard value or when the signal is obtained from a tape recorder or a picture record, the duration of the signal representing each picture line may deviate from the standard value. A delay line with a constant delay time would then no longer be compatible with the actual line scanning period so that the delayed signals would no longer be correlated with the undelayed signals and interference and distortions would occur during playback. In the TRIPAL system these interferences and distortions may be particularly strong because here two delay lines are connected in series and the resulting errors would thus be added.

It is already known to make the delay time of the delay line somewhat shorter than the nominal line scanning period, to connect the delay line in series with a controllable additional delay line, and to regulate the delay period of the latter. In this case a delayed and an undelayed pulse train are compared in a time or phase comparison circuit and the resulting time deviation, or difference, is used to produce a control voltage which controls the delay period of the additional delay line. In this case, however, the control range is limited and subject to a certain time constant so that the control voltage is usually not produced, and does not become effective sufficiently rapidly to correct for delay variations between succeeding lines.

SUMMARY OF THE INVENTION

It is an object of the present invention to provide a delay device which operates with novel electronic components and whose effective delay period automatically, and without inertia, adapts itself to the actual line scanning period of the signal.

This and other objects according to the invention are achieved by a circuit for delaying a television signal by an integral number of line scanning periods, which number may be one, composed of a memory with a plurality of memory elements into which time segments of the signals are read and from which they are interrogated by means of a clock pulse series, and control elements for causing, when there exists a signal with a fluctuating line scanning period (T), the clock pulse sequence to be derived from the fluctuating signal in such a manner that the delay period produced by the memory always corresponds to the actual presently existing line scanning period of the signal.

In the embodiments of the invention the memory contains, for example, a plurality of capacitors into which signal segments are read in time sequence by means of a switch which is controlled by the clock pulse sequence. These segments are then, in effect, stored in the invidual capacitors. During readout the switch interrogates the capacitors in sequence so that their stored signals are read out to again form a continuous signal which appears at the output of the switch and which is delayed relative to the original signal. Such a memory may preferably be of a type known as a "bucket cascade" circuit.

The bucket cascade circuit is known for the line delay of television signals, particularly color television signals and is disclosed in the German publication "Funktechnik," 1971, No. 6 at pages 195–198. However, it has heretofore been suggested only to use this circuit in connection with a signal having a constant line scanning period and the clock pulse sequence is not derived from a varying signal but from a constant signal, for example a quartz stabilized chrominance subcarrier. In the previously disclosed arrangement, an adaptation of the delay period to a fluctuatibg line scanning period is neither intended nor possible.

The present invention is based on the recognition that a memory of the above-described type, particularly a bucket cascade circuit, permits in an advantageous manner a continuous, instantaneously responsive adjustment of the effective delay period to the actual line scanning period during each such line scanning period. This is so because the delay period is determined not only by the characteristics of the circuit but also by the frequency of the clock pulse sequence controlling the circuit.

With ultrasonic delay lines this is not possible because their delay period is determined by the structure of the line, i.e., the length of the delay medium.

The present invention advantageously utilizes a particular property of the above-described special type of memory for a special purpose, i.e., for adapting the delay period to the current line scanning period in a line sequential television signal exhibiting fluctuating, or varying, line scanning periods.

DESCRIPTION OF THE PREFERRED EMBODIMENTS

Figure 1:
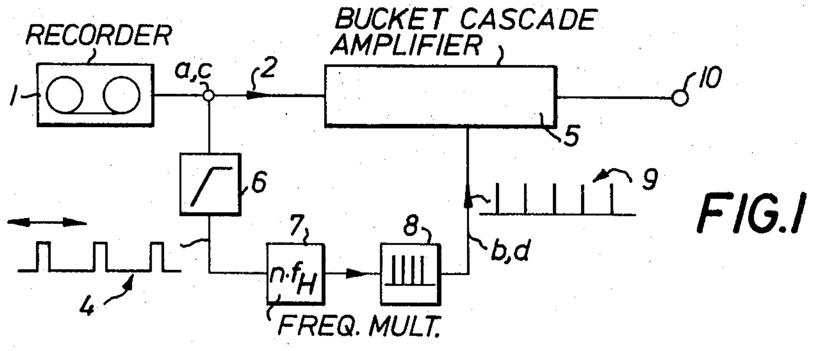
FIG. 1 is a block circuit diagram of one embodiment of the present invention.
Figure 2A:
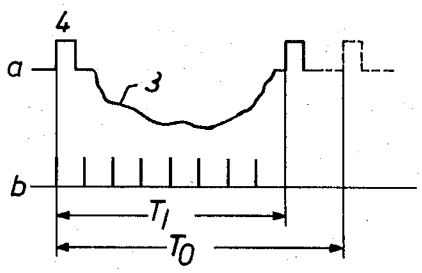
FIGS. 2*a* and 2*b* are graphs presenting signal waveforms used in explaining the operation of the invention.
Figure 2B:
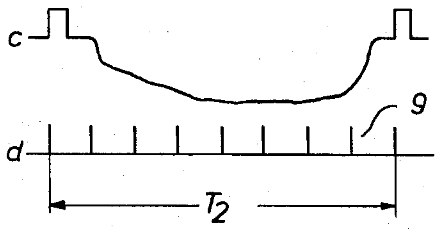

Referring to FIGS. 1, 2*a* and 2*b*, a video signal 3 comes from a recording device 1, for example a video disc or tape player, via a line 2, and contains line sync pulses 4 whose line scanning period $T_1$ is in this example shorter than nominal because the speed of the recording carrier is too high with respect to th nominal line scanning period $T_0$. The lower case letters in FIG.

1 illustrate the locations of the correspondingly identified waveforms of FIGS. 2*a* and 2*b*.

The signal 3, 4 is fed to a bucket cascade circuit 5. A separator stage 6 separates the line synch pulses 4, having pulse intervals of fluctuating duration, and feeds them to a frequency multiplier 7 having a multiplication factor of *n*. Multiplier 7 produces an alternating voltage whose frequency is n times the currently existing frequency $f_H$ of the line synch pulses associated with the video signal. The output from multiplier 7 is fed to pulse generator 8 to cause it to produce a series of clock pulses 9.

For purposes of explanation it can be assumed that the generator 8 produces eight such pulses during each line scanning period and the bucket cascade circuit 5 has a corresponding number of memory elements so that its memory is just filled by the eight pulses. In reality the number of pulses will be much higher, depending on the bandwidth employed, and will, for example, be between 100 and 600.

The frequency of the output voltage from multiplier 7 is controlled by the then-existing line sync frequency determined by the intervals between pulses 4. If this interval should fluctuate over a period of time, the multiplier output frequency will fluctuate in a corresponding manner. The memory of bucket cascade circuit 5 is thus filled exactly during the line scanning period $T_1$ so that at the completion of this period the signal fed in through line 2 appears at the output 10 with a delay equal to this line scanning period $T_1$. The delay period thus exactly corresponds to the actual line scanning period $T_1$ although this deviates from the nominal line scanning period $T_0$.

In the situation illustrated in FIG. 2*b*, the recording carrier is advancing at less than its nominal speed so that the actual line scanning period $T_2$ is longer than the rated line scanning period $T_0$. The circuit 6, 7, 8 now operates to produce eight clock pulses 9 during the actual line scanning period $T_2$. This means that the memory 5 is filled during period $T_2$ and at the end of this period presents the delayed signal at terminal 10. Thus the effective delay period is now $T_2$ and is adapted to the actual line scanning period $T_2$. Independently of the value of the actual line scanning period, be it $T_1$, $T_0$, or $T_2$, the signal fed to memory 5 is thus always delayed by this actual line scanning period, so that the signal associated with a horizontal picture line K begins in the desired manner with a delay which puts it exactly at the beginning of line K+1.

The present invention can be used in various systems and playback devices, in which a delay by the actual line scanning period is required. It may be used, for example, in a PAL decoder, in a TRIPAL playback circuit, in a SECAM decoder, or in a playback instrument for the BIPAL color recording system.

Figure 3:
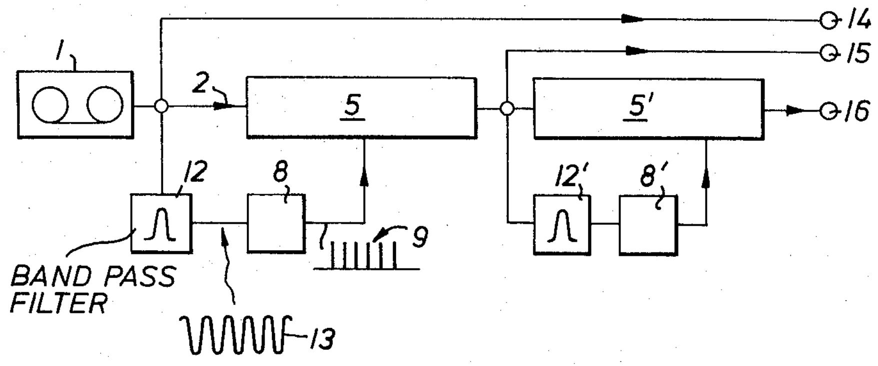
FIG. 3 is a block circuit diagram of a further embodiment of the present invention.

FIG. 3 shows the use of the present invention in a TRIPAL system. In this system two series connected memories 5 and 5' are required in order to delay the respective signal by an amount equal to the duration of two line scanning periods. In this embodiment the pulse train 9 is produced in a generator 8 which is controlled by a chrominance subcarrier 13 superimposed on the video signal and extracted therefrom by means of a bandpass filter 12. The chrominance subcarrier frequency is related to the line scanning frequency $f_H$, i.e. the number of chrominance subcarrier periods per line scanning period is constant. This means that the chrominance subcarrier 13 always feeds the same number of oscillations to the generator 8 during each line scanning period.

An identical further circuit arrangement is provided for further delaying the signal which has been correctly delayed by one line scanning period and which appears at the output of memory 5. This further arrangement is constituted by bucket cascade circuit 5', bandpass filter 12' and pulse generator 8' and operates exactly in the same manner as device 5, 12, 8. The signal coming directly from recorder 1, as well as the signal delayed by one line scanning periods and the signal delayed by two line scanning periods are then available at the three terminals 14, 15 and 16, respectively.

According to a further embodiment of the present invention the clock pulse generator 8 and the memory 5 are so designed that the delay period is always equal to the standard line scanning duration even for signals of different standard line scanning frequencies, e.g., at 405, 525, 625, 819 lines per frame, corresponding to line scan frequencies of 10,125; 15,625; 15,750; and 20,475 Hz, respectively, without there being any need for switching. To process signals for different line scanning periods a plurality of different delay lines are presently required to effect the delay by the line scanning period. The circuit of the present invention however is dimensioned in such a manner that the effective delay period of the memory adapts itself to the existing line scanning duration of the signal and thus a single memory is sufficient for all standards. For example, for a 625-line per frame signal a pulse train 9 containing 120 pulses per line is produced in generator 8 for each line scanning period so that memory 5 emits the signal at the end of each line scanning period associated with the 625-line picture. For a signal with 405 lines per frame, and the correspondingly longer line scanning period, the generator 8 again produces 120 pulses during each line scanning period so that memory 5 again delivers the line picture information signal to terminal 10 exactly after the now longer line scanning period. A switching for signals with different line scanning periods is thus not required. A similar result can be achieved with a circuit as shown in FIG. 3, constructed with two series connected memories.

It will be understood that the above description of the present invention is susceptible to various modifications, changes and adaptations, and the same are intended to be comprehended within the meaning and range of equivalents of the appended claims.

I claim:

1. In a circuit for delaying, by an integral number of line scanning periods, a recorded video signal being played back from a video recorder whose output speed is subjected to fluctuation in the duration of a line scanning period, and including a memory composed of a plurality of memory elements and arranged to store the signal representing one video picture line at a time, with each memory element storing a respective segment of such picture line signal, means for connecting the input of said memory to the output of said recorder, and clock pulse generator means connected to the memory for producing a train of clock pulses during each line scanning period, each pulse causing the signal segment stored in a respective element during a preceding line scanning period to be read out, the improvement comprising circuit means connected between said recorder and said clock pulse generator means for receiving a component of said video signal for detecting the actual, presently existing line period duration of said signal and for controlling the frequency of said clock pulse generator means such that the number of pulses in the train of clock pulses per line scanning period of the video signal is substantially constant and the clock pulses have a repetition rate directly proportional to the duration of the actual, presently existing line scanning period, and for thereby causing the delay produced by said memory to always correspond to said existing line scanning period of the video signal applied to said memory and derived from said recorder whereby any fluctuation in the speed of said video recorder and in the line scanning period may be instantly compensated for.

2. An arrangement as defined in claim 1 which automatically adjusts its delay to any one of the line scanning frequencies 10,125 Hz, 15,625 Hz, 15,750 Hz, or 20,475 Hz.

3. An arrangement as defined in claim 1 wherein said control means comprises frequency multiplication means connected for producing, and applying to said memory, a signal whose frequency is a fixed multiple of the line sync pulse train contained in the video signal.

4. An arrangement as defined in claim 1 wherein the video signal contains a pilot signal superimposed therein and constituting the component received by said circuit means.

5. An arrangement as defined in claim 4 wherein the video signal is a color signal having a chrominance subcarrier constituting the pilot signal.

6. An arrangement as defined in claim 1 wherein said memory is a bucket cascade circuit.

7. An arrangement as defined in claim 1 wherein said clock pulse generator means and said memory constitute means for producing a delay whose duration always remains equal to the nominal line scanning period even for signals with respectively different nominal line scanning frequencies, without there being any need for switching.

* * * * *